US012440306B2

(12) United States Patent
Kato et al.

(10) Patent No.: US 12,440,306 B2
(45) Date of Patent: Oct. 14, 2025

(54) DENTAL TREATMENT APPARATUS AND METHOD OF DRIVING THE SAME

(71) Applicant: J. MORITA MFG. CORP., Kyoto (JP)

(72) Inventors: Kyohei Kato, Kyoto (JP); Kazunari Matoba, Kyoto (JP)

(73) Assignee: J. MORITA MFG. CORP., Kyoto (JP)

(*) Notice: Subject to any disclaimer, the term of this patent is extended or adjusted under 35 U.S.C. 154(b) by 792 days.

(21) Appl. No.: 17/429,168

(22) PCT Filed: Jan. 8, 2020

(86) PCT No.: PCT/JP2020/000297
§ 371 (c)(1),
(2) Date: Aug. 6, 2021

(87) PCT Pub. No.: WO2020/162090
PCT Pub. Date: Aug. 13, 2020

(65) Prior Publication Data
US 2022/0087777 A1 Mar. 24, 2022

(30) Foreign Application Priority Data
Feb. 6, 2019 (JP) ................................ 2019-019568

(51) Int. Cl.
*A61C 1/07* (2006.01)
*A61C 1/00* (2006.01)
(Continued)

(52) U.S. Cl.
CPC ................ *A61C 1/07* (2013.01); *A61C 1/003* (2013.01); *A61C 1/12* (2013.01); *A61C 5/44* (2017.02); *A61C 19/041* (2013.01)

(58) Field of Classification Search
CPC ..... A61C 1/003; A61C 1/02–07; A61C 1/082; A61C 1/12; A61C 19/041; A61C 19/042; A61C 5/44
See application file for complete search history.

(56) References Cited

U.S. PATENT DOCUMENTS 5,980,248 A * 11/1999 Kusakabe ............... H02P 7/288 433/131
2013/0099710 A1 4/2013 Okamoto
(Continued)

FOREIGN PATENT DOCUMENTS

CN 102427774 A 4/2012
CN 103379875 A 10/2013
(Continued)

OTHER PUBLICATIONS

Kobayashi et al. JP2007229110 English Translation, Sep. 2007, Description (Year: 2024).*
(Continued)

*Primary Examiner* — Ralph A Lewis
(74) *Attorney, Agent, or Firm* — Osha Bergman Watanabe & Burton LLP

(57) ABSTRACT

A dental treatment apparatus according to the present invention includes a drive unit that includes a micromotor, a motor driver, and the like, a controller, and a root canal length measurement circuit. The controller controls the cutting tool to be held at a head forward driven in a direction of cutting of an object to be cut. The controller also controls the cutting tool to be reverse driven in a direction reverse to forward rotation drive when the cutting tool is forward driven and the root canal length measurement circuit detects a tip end of the cutting tool reaching a reference position. The controller further carries out a fail-safe control when the cutting tool is reverse driven and the root canal length measurement circuit detects movement of the tip end of the cutting tool toward a root apex position.

20 Claims, 10 Drawing Sheets

(51) Int. Cl.

| | |
|---|---|
| ***A61C 1/12*** | (2006.01) |
| ***A61C 5/44*** | (2017.01) |
| ***A61C 19/04*** | (2006.01) |

(56) References Cited

U.S. PATENT DOCUMENTS

| | | | | |
|---|---|---|---|---|
| 2013/0224677 | A1* | 8/2013 | Yamashita | A61C 19/042 433/27 |
| 2014/0134565 | A1 | 5/2014 | Kunisada | |
| 2014/0322669 | A1 | 10/2014 | Kunisada | |
| 2017/0065370 | A1* | 3/2017 | Nakai | A61B 5/0066 |
| 2019/0380813 | A1 | 12/2019 | Kato et al. | |

FOREIGN PATENT DOCUMENTS

| | | | | |
|---|---|---|---|---|
| CN | 103717172 | A | | 4/2014 |
| CN | 108712111 | A | | 10/2018 |
| JP | 2007229110 | A | * | 9/2007 |
| JP | 2018-149169 | A | | 9/2018 |
| WO | 2012-164875 | A1 | | 12/2012 |
| WO | 2018168636 | A1 | | 9/2018 |

OTHER PUBLICATIONS

Office Action in counterpart Chinese Patent Application No. 202080012916.2 issued on Mar. 1, 2022 (16 pages).

Extended European Search Report issued in European Application No. 20752064.4, dated Sep. 12, 2022 (7 pages).

International Search Report for corresponding International Application No. PCT/JP2020/000297, mailed Mar. 24, 2020 (5 pages).

Written Opinion for corresponding International Application No. PCT/JP2020/000297, mailed Mar. 24, 2020 (5 pages).

* cited by examiner

100
MOTOR DRIVER
NOTIFICATION UNIT
CONTROLLER
ROOT CANAL LENGTH MEASUREMENT CIRCUIT
COMPARISON CIRCUIT
SETTING UNIT
DISPLAY
OPERATION PORTION
19a

DENTAL TREATMENT APPARATUS AND METHOD OF DRIVING THE SAME

TECHNICAL FIELD

The present invention relates to a dental treatment apparatus including a handpiece and particularly to a dental treatment apparatus that cuts cutting an inner wall of a root canal of a tooth (which is also simply referred to as a root canal below) and enlarging the root canal and a method of driving the same.

BACKGROUND ART

In dental treatment, treatment for cutting and enlarging a root canal may be performed. In the treatment, a dental treatment apparatus in which a cutting tool called a file or a reamer is attached to a head of a handpiece is used and a root canal is cut and enlarged by driving the cutting tool. When the dental treatment apparatus drives the cutting tool to cut and enlarge the root canal, a cutting-edge of the cutting tool may dig into a wall of the root canal, and as the cutting tool is forcibly rotated while the cutting tool is engaged in this portion of dig, the cutting tool may be twisted and broken.

PTL 1 discloses a dental treatment apparatus including a handpiece in which a cutting tool is twist driven to perform a forward and reverse rotation operation in which a direction of rotation of a motor is reversed every certain time period and the cutting tool repeats forward rotation and reverse rotation every certain time period in order to prevent break of the cutting tool.

CITATION LIST

Patent Literature

PTL 1: WO2012/164875

SUMMARY OF INVENTION

Technical Problem

The cutting tool includes a first cutting tool that is capable of cutting a root canal when it is driven clockwise but is incapable of cutting the root canal or is lower in cutting efficiency when it is driven counterclockwise and a second cutting tool that is capable of cutting the root canal when it is driven counterclockwise but is incapable of cutting the root canal or is lower in cutting efficiency when it is driven clockwise.

When the first cutting tool is attached to the head, the dental treatment apparatus disclosed in PTL 1 can efficiently cut the root canal by twist drive in which an angle of clockwise rotation is larger than an angle of counterclockwise rotation. When the second cutting tool is attached to the head, on the other hand, the dental treatment apparatus can efficiently cut the root canal by twist drive in which the angle of counterclockwise rotation is larger than the angle of clockwise rotation.

When the second cutting tool is wrongly attached with the intention of attaching the first cutting tool to the head, however, the dental treatment apparatus performs an operation different from drive operated by a user. In particular, in the dental treatment apparatus including a root canal length measurement circuit, when the tip end of the cutting tool reaches a root apex position, control for switching twist drive in which the angle of clockwise rotation is larger than the angle of counterclockwise rotation to counterclockwise drive is carried out. At this time, when the cutting tool attached to the head is wrong, an unintended operation (abnormal operation) is performed.

The present invention was made to solve the problems above, and an object thereof is to provide a dental treatment apparatus that can safely drive a cutting tool even when a wrong cutting tool is attached to a head and a method of driving the same.

Solution to Problem

A dental treatment apparatus according to the present invention includes a drive unit that drives a cutting tool held at a head of a handpiece, a controller that controls the drive unit that drives the cutting tool, and a position detector that detects a position of a tip end of the cutting tool within a root canal by electric root canal length measurement. The controller has the cutting tool held at the head forward driven in a direction of cutting of an object to be cut, has the cutting tool reverse driven in a direction reverse to forward rotation drive when the cutting tool is forward driven and the position detector detects the tip end of the cutting tool reaching a reference position, and carries out fail-safe control when the cutting tool is reverse driven and the position detector detects movement of the tip end of the cutting tool toward a root apex position.

Another dental treatment apparatus according to the present invention includes a drive unit that drives a cutting tool held at a head of a handpiece, a controller that controls the drive unit that drives the cutting tool, and a load detector that detects a load applied to the cutting tool. The controller has the cutting tool held at the head forward driven in a direction of cutting of an object to be cut, has the cutting tool reverse driven in a direction reverse to forward rotation drive when the cutting tool is forward driven and the load applied to the cutting tool and detected by the load detector is equal to or higher than a reference load, and carries out fail-safe control when the cutting tool is reverse driven and the load applied to the cutting tool and detected by the load detector is equal to or higher than the reference load.

A method of driving a dental treatment apparatus according to the present invention is a method of driving a dental treatment apparatus including a drive unit that drives a cutting tool held at a head of a handpiece, a controller that controls the drive unit that drives the cutting tool, and a position detector that detects a position of a tip end of the cutting tool within a root canal by electric root canal length measurement. The method includes forward driving, under the control by the controller, the cutting tool held at the head in a direction of cutting of an object to be cut, reverse driving, under the control by the controller, the cutting tool in a direction reverse to forward rotation drive when the cutting tool is forward driven and the position detector detects the tip end of the cutting tool reaching a reference position, and carrying out, by the controller, fail-safe control when the cutting tool is reverse driven and the position detector detects movement of the tip end of the cutting tool toward a root apex position.

Advantageous Effects of Invention

The dental treatment apparatus according to the present invention carries out fail-safe control when the cutting tool is reverse driven and an unintended operation is performed.

Therefore, the cutting tool can safely be driven even when a wrong cutting tool is attached to the head.

DESCRIPTION OF EMBODIMENTS

Overview

Figure 1:
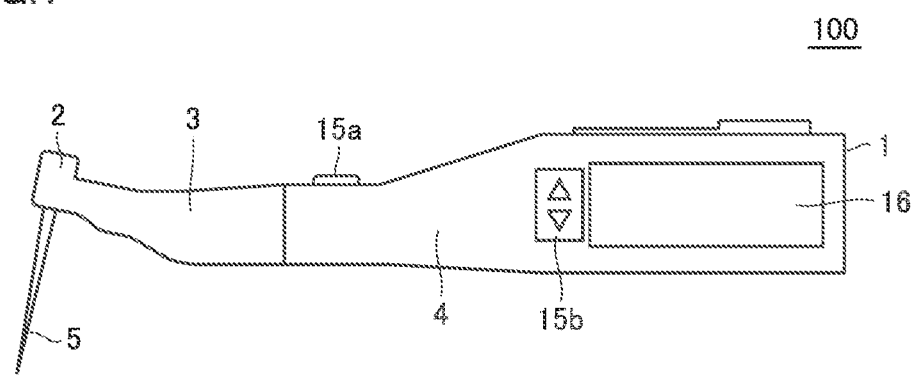
FIG. 1 is a schematic diagram showing a construction of a root canal treatment instrument according to the present first embodiment.

Treatment for cutting and enlarging a root canal is very difficult because a degree of curve of a root canal or a condition of calcification and clogging of the root canal is different from person to person. In cutting and enlarging a root canal with the use of a root canal treatment instrument representing a dental treatment apparatus, the root canal from a mouth of the root canal to a root apex position should be cut and enlarged. A technique for preventing cutting and enlargement beyond the root apex position has been known.

Specifically, when the root canal treatment instrument determines that a tip end of a cutting tool reaches the root apex position with the use of a root canal length measurement circuit, the root canal treatment instrument prevents cutting and enlargement beyond the root apex position by switching drive of the cutting tool from forward rotation drive to reverse rotation drive. Forward rotation drive refers to drive in a direction of cutting of a wall of the root canal which is an object to be cut, and for a first cutting tool, forward rotation drive refers to clockwise drive. Reverse rotation drive refers to drive in a direction reverse to forward rotation drive, and for the first cutting tool, reverse rotation drive refers to counterclockwise drive. A cutting edge of the first cutting tool is formed such that cutting is done by clockwise drive. Therefore, when the first cutting tool is driven with clockwise drive being defined as forward rotation drive, the tip end of the first cutting tool advances toward the root apex position as if a screw was tightened. In contrast, when the first cutting tool is driven with counterclockwise drive being defined as reverse rotation drive, the tip end of the first cutting tool advances in a direction away from the root apex position as if a screw was loosened.

The cutting tool that can be attached to the head of the root canal treatment instrument includes not only the first cutting tool having a cutting edge formed to carry out cutting in clockwise drive but also a second cutting tool having a cutting edge formed to carry out cutting in counterclockwise drive. The cutting edge of the second cutting tool is formed to carry out cutting in counterclockwise drive. Therefore, when the second cutting tool is driven with counterclockwise drive being defined as forward rotation drive, the tip end of the cutting tool advances toward the root apex position. In contrast, when the second cutting tool is driven with clockwise drive being defined as reverse rotation drive, the tip end of the cutting tool advances in the direction away from the root apex position. Therefore, when the second cutting tool is attached to the head of the root canal treatment instrument with the intention of attaching the first cutting tool, an operation unintended by a user (an abnormal operation) is consequently performed. In other words, when the root canal treatment instrument determines that the tip end of the cutting tool reaches the root apex position and then the cutting tool is driven in reverse rotation drive, the tip end of the cutting tool does not move away from the root apex position but advances further toward the root apex position to the contrary, and the operation unintended by the user is performed.

Then, in the root canal treatment instrument described herein, two-tiered control is carried out in which, when the root canal treatment instrument determines that the tip end of the cutting tool reaches the root apex position and the cutting tool is driven in reverse rotation drive and when an operation to further advance toward the root apex position is performed, determination as an abnormal operation is made and drive is stopped. When the first cutting tool is attached to the head of the root canal treatment instrument with the intention of attaching the second cutting tool, relation of the direction of drive of the root canal treatment instrument with forward rotation drive and reverse rotation drive is opposite.

In the root canal treatment instrument, the cutting tool can be driven not only in simple forward rotation drive and reverse rotation drive but also in twist drive which is combination of forward rotation drive and reverse rotation drive. The root canal treatment instrument can efficiently cut the root canal in twist drive of the first cutting tool in which an angle of clockwise rotation is larger than an angle of counterclockwise rotation. Furthermore, the root canal treatment instrument can efficiently cut the root canal in twist drive of the second cutting tool in which an angle of counterclockwise rotation is larger than an angle of clockwise rotation. In driving the cutting tool in twist drive, clockwise drive and counterclockwise drive are included without fail. Therefore, a user is less likely to be aware of attachment of a wrong cutting tool to the head of the root canal treatment instrument.

Drive including clockwise drive and twist drive in which an angle of rotation in clockwise drive is larger than an angle of rotation in counterclockwise drive is herein mainly referred to as clockwise drive, and drive including counterclockwise drive and twist drive in which an angle of rotation in counterclockwise drive is larger than an angle of rotation in clockwise drive is herein mainly referred to as counterclockwise drive. Clockwise drive of the first cutting tool is referred to as forward rotation drive, counterclockwise drive of the first cutting tool is referred to as reverse rotation drive, counterclockwise drive of the second cutting tool is referred to as forward rotation drive, and clockwise drive of the second cutting tool is referred to as reverse rotation drive.

A specific embodiment of two-tiered control including control from forward rotation drive to reverse rotation drive carried out when the tip end of the cutting tool reaches the root apex position and fail-safe control for preventing an abnormal operation in reverse rotation control due to attachment of a wrong cutting tool to the head in the root canal treatment instrument described herein will be described in detail below with reference to the drawings.

First Embodiment

Figure 2:
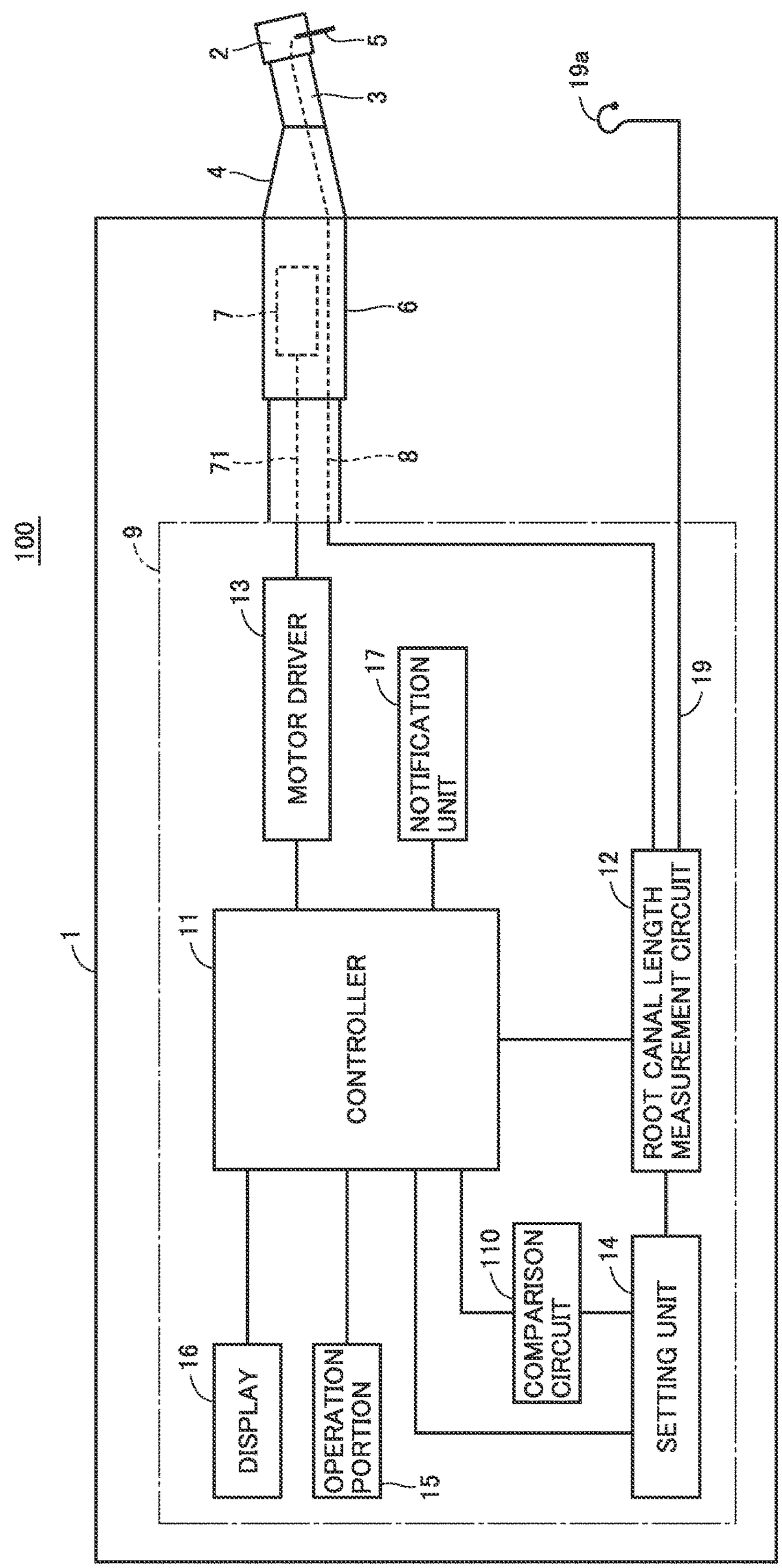
FIG. 2 is a block diagram showing a functional configuration of the root canal treatment instrument according to the present first embodiment.

FIG. 1 is a schematic diagram showing a construction of a root canal treatment instrument 100 according to the present first embodiment. FIG. 2 is a block diagram showing a functional configuration of the root canal treatment instrument according to the present first embodiment. Root canal treatment instrument 100 including a handpiece 1 for dental root canal treatment containing a system for enlargement of a root canal and measurement of a root canal length will be described as a dental treatment apparatus according to the present first embodiment. The dental treatment apparatus according to the present invention, however, is not limited to root canal treatment instrument 100 but is applicable to a similarly configured dental treatment apparatus.

Root canal treatment instrument 100 shown in FIG. 1 includes handpiece 1 for dental root canal treatment containing a motor unit 6 and a control box 9. Root canal treatment instrument 100 shown in FIG. 1 is a cordless type root canal treatment instrument, rather than being constructed such that handpiece 1 is coupled to the control box through a hose.

Handpiece 1 for dental root canal treatment includes a head 2, a neck 3 small in diameter and continuous to head 2, and a grip 4 continuous to neck 3 and gripped with fingers. Motor unit 6 for rotatably driving a cutting tool 5 (a file or a reamer) held by head 2 and control box 9 are contained in grip 4.

As shown in FIG. 2, motor unit 6 contains a micromotor 7 and is connected to control box 9 through a power supply lead 71 supplying power to micromotor 7 and a signal lead 8 transmitting a signal to a root canal length measurement circuit 12 which will be described later. Signal lead 8 is a part of a conductor electrically connected to cutting tool 5 with motor unit 6 and handpiece 1 being interposed and transmitting an electric signal. Cutting tool 5 serves as one electrode of root canal length measurement circuit 12.

Control box 9 includes a controller 11, a comparison circuit 110, root canal length measurement circuit 12, a motor driver 13, a setting unit 14, an operation portion 15, a display 16, and a notification unit 17. Though not shown in FIG. 1, a lead 19 may be drawn, for example, from grip 4. Lead 19 has one end coupled to root canal length measurement circuit 12 and has the other tip end attached as being in electrical conduction to a mouth cavity electrode 19*a* placed over a lip of a patient. Mouth cavity electrode 19*a* serves as the other electrode of root canal length measurement circuit 12.

Controller 11 is responsible for overall control of the root canal enlargement and root canal length measurement system and a main portion thereof is implemented by a microcomputer. Comparison circuit 110, root canal length measurement circuit 12, motor driver 13, setting unit 14, operation portion 15, display 16, and notification unit 17 are connected to controller 11. Controller 11 controls a direction of rotation of cutting tool 5 cutting an object to be cut. Specifically, controller 11 controls any of clockwise drive for rotating cutting tool 5 in the clockwise (also referred to as right) direction and counterclockwise drive for rotating cutting tool 5 in the counterclockwise (also referred to as left) direction in accordance with a drive sequence. A direction of rotation of the cutting tool (clockwise or counterclockwise) is discussed with the direction from the side of cutting tool 5 attached to head 2 toward the tip end of cutting tool 5 being defined as the reference. Controller 11 can control drive for rotating cutting tool 5 with parameters including an angle of rotation, a rotation speed, or an angular rotation speed (the number of rotations) in the clockwise direction, an angle of rotation, a rotation speed, or an angular rotation speed (the number of rotations) in the counterclockwise direction, and the number of times of repetition being changed.

An angle of rotation refers to an amount of rotation representing an extent of rotation of cutting tool 5 clockwise or counterclockwise, and it may be defined by a time period for rotation (also called a time period for drive) when the number of times of rotation or an angular rotation speed (the number of rotations) is constant. An angle of rotation may be defined by an amount associated with drive of cutting tool 5 such as an amount of a drive current or an amount of torque. Strictly speaking, for example, correspondence between a time period for rotation in terms of control and an actual angle of rotation may have to be corrected depending on a load applied to the cutting tool or the motor, however, an amount of correction is extremely small and hence it is ignorable in carrying out the present invention.

Comparison circuit 110 is necessary for detecting a load applied to cutting tool 5 and can selectively be provided when detection of the load is necessary. Comparison circuit 110 can compare a load at any time point during rotation of cutting tool 5 clockwise or counterclockwise by motor driver 13. Specifically, comparison circuit 110 can compare a load applied to cutting tool 5 with a reference load after cutting tool 5 is rotated by a prescribed angle of rotation (for example, 180 degrees) clockwise or counterclockwise.

Root canal length measurement circuit 12 is necessary for detecting a position of a tip end of cutting tool 5 in a root canal, and can selectively be provided when detection of the position is necessary. Root canal length measurement circuit 12 forms a closed circuit with cutting tool 5 inserted in a root canal being defined as one electrode and mouth cavity electrode 19*a* placed over a lip of a patient being defined as the other electrode. Root canal length measurement circuit 12 can measure a distance from a position of a root apex of a tooth to the tip end of cutting tool 5 by measuring an impedance between cutting tool 5 and mouth cavity electrode 19*a* by applying a measurement voltage across cutting tool 5 and mouth cavity electrode 19*a*. When root canal length measurement circuit 12 detects the tip end of cutting tool 5 reaching the position of the root apex, an amount of insertion of the cutting tool, that is, the distance from a mouth of the root canal to the tip end of the cutting tool, can be defined as a root canal length. An electric root canal length measurement method for measuring a root canal length by measuring an impedance between cutting tool 5 and mouth cavity electrode 19*a* has been known, and all known electric root canal length measurement methods are applicable to root canal treatment instrument 100 according to the first embodiment.

Motor driver 13 is connected to micromotor 7 through power supply lead 71 and controls power supplied to micromotor 7 based on a control signal from controller 11. Motor driver 13 can control a direction of rotation, the number of rotations, and an angle of rotation of micromotor 7, that is, a direction of rotation, the number of rotations, and an angle of rotation of cutting tool 5, by controlling power supplied to micromotor 7. The drive unit is constituted mainly of micromotor 7 and motor driver 13.

Setting unit 14 includes a selection button 15*b* (see FIG. 1) for changing setting on a surface of grip 4. By operating selection button 15*b*, the reference for controlling a direction of rotation, the number of rotations, and an angle of rotation of cutting tool 5 is set. Setting unit 14 can set not only a parameter such as the number of rotations and the angle of rotation of cutting tool 5 but also selection as to whether or not to measure a length of the root canal. Setting unit 14 further sets a switch criterion to be compared by comparison circuit 110 with a load applied to cutting tool 5 (a criterion for switching a parameter of a drive sequence or a drive pattern), a reference load, and timing.

Operation portion 15 includes a drive start and stop button 15*a* (see FIG. 1) on the surface of grip 4. By operating drive start and stop button 15*a*, drive of cutting tool 5 can be started or stopped. Specifically, when drive start and stop button 15*a* is operated while drive of cutting tool 5 remains stopped, operation portion 15 transmits an instruction signal to start drive of cutting tool 5 to controller 11. When drive start and stop button 15*a* is operated during a period for which cutting tool 5 is driven, operation portion 15 transmits an instruction signal to stop drive of cutting tool 5 to controller 11. A period for which cutting tool 5 is driven refers to a period from start of drive of cutting tool 5 in response to an operation onto drive start and stop button 15*a* until stop of drive. Therefore, forced stop of drive of cutting tool 5 as a result of a detected load being equal to higher than a reference load is encompassed in the period for which cutting tool 5 is driven, because drive of cutting tool 5 is not stopped by an operation onto drive start and stop button 15*a*. Display 16 shows a position of the tip end of cutting tool 5 in a root canal or a direction of rotation, the number of rotations, and an angle of rotation of cutting tool 5. Display 16 can also show information given by notification unit 17 to a user. In cordless type root canal treatment instrument 100, display 16 is provided in grip 4. Therefore, a user can check such information as whether cutting tool 5 is driven in a cutting direction or in a non-cutting direction, where cutting tool 5 is currently located, how much load is applied to cutting tool 5, and how many the number of rotations is, without greatly changing a line of sight.

Notification unit 17 gives a notification about a state of drive of cutting tool 5 currently under the control by controller 11 through light, sound, or vibration. Specifically, notification unit 17 is provided with a light emitting diode (LED), a speaker, or an oscillator as necessary for giving a notification about a state of drive of cutting tool 5, and changes a color of the LED emitting light or changes sound output from the speaker between clockwise drive and counterclockwise drive. When display 16 can show a state of drive of cutting tool 5 to a user, notification unit 17 does not have to separately include an LED, a speaker, or an oscillator.

Figure 3:
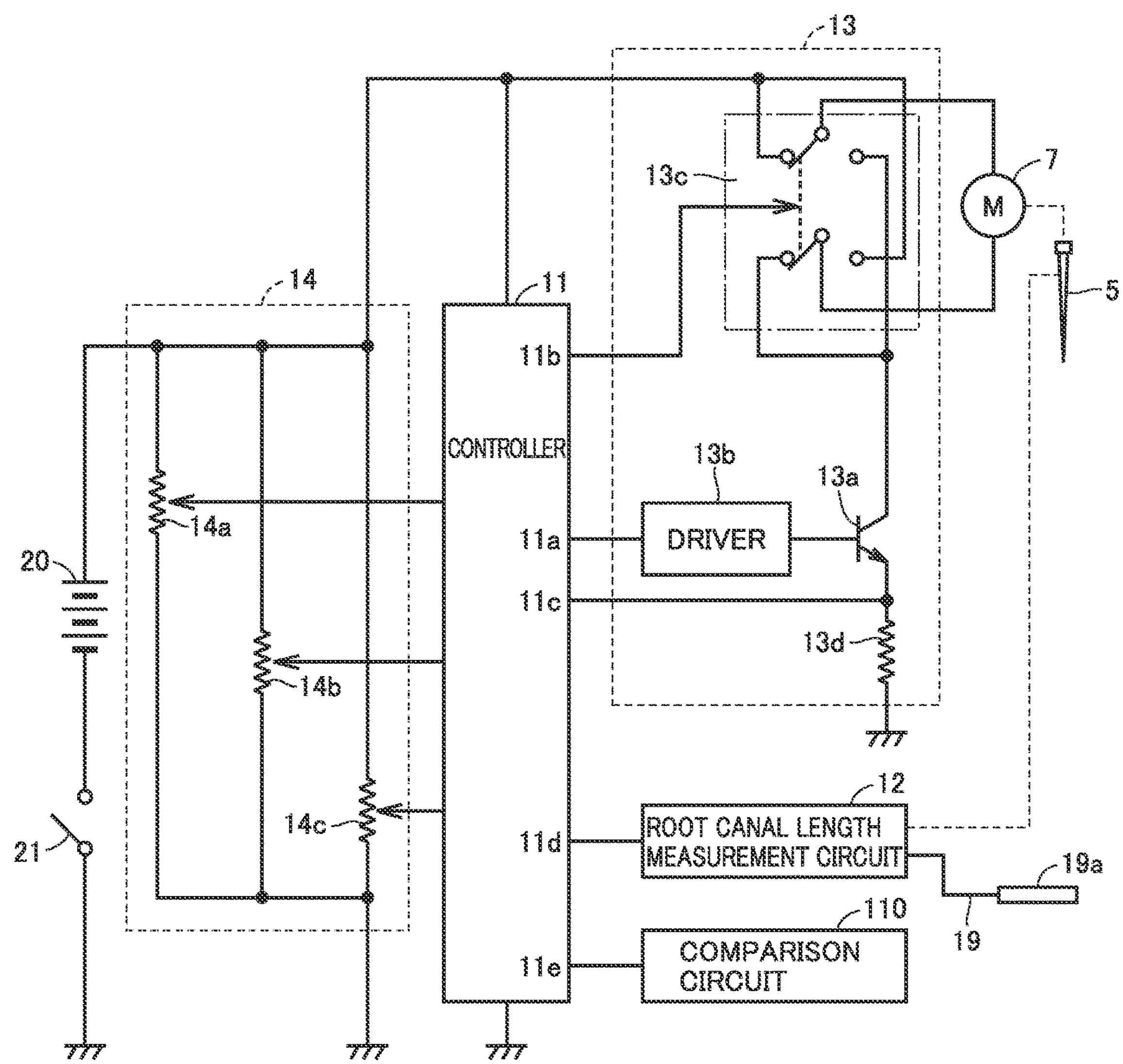
FIG. 3 is a circuit diagram showing a circuit configuration of the root canal treatment instrument according to the present first embodiment.

A circuit configuration of root canal treatment instrument 100 for controlling drive of cutting tool 5 will now be described in further detail. FIG. 3 is a circuit diagram showing a circuit configuration of root canal treatment instrument 100 according to the present first embodiment. In connection with root canal treatment instrument 100 shown in FIG. 3, micromotor 7 involved with drive and control of cutting tool 5, controller 11, comparison circuit 110, root canal length measurement circuit 12, motor driver 13, and setting unit 14 are shown.

Motor driver 13 includes a transistor switch 13*a*, a transistor driver circuit 13*b*, a rotation direction switch 13*c*, and a load detection resistor 13*d*. Though rotation direction switch 13*c* is described as a relay element, a motor drive circuit may be configured with a semiconductor switching element such as an FET. Setting unit 14 includes a reference load setting variable resistor 14*a*, a duty setting variable resistor 14*b*, and a reference position setting variable resistor 14*c*. Though setting unit 14 includes also a feature setting an angle of rotation (or a time period for rotation) indicating timing of comparison between a detected load and a reference load by comparison circuit 110, FIG. 3 does not show such a feature. Root canal treatment instrument 100 shown in FIG. 3 is connected to a main power supply 20 and a main switch 21. Cutting tool 5 is held by micromotor 7 with an appropriate gear mechanism being interposed, although it is not shown.

Transistor driver circuit 13*b* is activated by a control signal output from a port 11*a* of controller 11, controls on and off of transistor switch 13*a*, and drives micromotor 7. Micromotor 7 rotates clockwise or counterclockwise in accordance with a state of rotation direction switch 13*c*. When a control signal output from port 11*a* of controller 11 has a waveform of pulses, for example, as being repeated in a certain period, a width of the waveform of the pulses, that is, a duty ratio, is adjusted by duty setting variable resistor 14*b* of setting unit 14. Micromotor 7 drives cutting tool 5 at the number of rotations corresponding to the duty ratio.

Rotation direction switch 13*c* switches between drive of cutting tool 5 in the clockwise direction and counterclockwise drive in accordance with a control signal output from a port 11*b* of controller 11. Controller 11 detects a load applied to cutting tool 5 based on an amount of a current (or a voltage value) from load detection resistor 13*d* input to a port 11*c*. Therefore, load detection resistor 13*d* functions as a load detector detecting a load applied to cutting tool 5. The load detector is not limited to a feature detecting a load applied to cutting tool 5 based on an amount of a current (or a voltage value) from load detection resistor 13*d*, but may be implemented, for example, by another feature such as a feature detecting a load applied to cutting tool 5 by providing a torque sensor in a unit driving cutting tool 5. A detected load is converted, for example, into a value for torque applied to cutting tool 5 by controller 11 and shown on display 16. Comparison circuit 110 compares the torque value resulting from conversion by controller 11 with a torque value set by reference load setting variable resistor 14*a*. Comparison circuit 110 may naturally directly compare an amount of a current (or a voltage value) from load detection resistor 13*d* with an amount of a current (or a voltage value) from variable resistor 14*a* without conversion into a torque value.

Controller 11 receives input of a root canal length measured with root canal length measurement circuit 12 at a port 11*d*. Therefore, root canal length measurement circuit 12 functions as a position detector detecting a position of the tip end of cutting tool 5 in a root canal. Controller 11 outputs a load applied to cutting tool 5 and detected by the load detector from a port 11*e* to comparison circuit 110, and receives input of a result of comparison resulting from comparison with the reference load by comparison circuit 110 at port 11*e*. Therefore, comparison circuit 110 functions as a load comparator comparing a load detected by the load detector with the reference load. Controller 11 may be configured such that the features described as analog circuits are integrated as software in one microcomputer.

Figure 4:
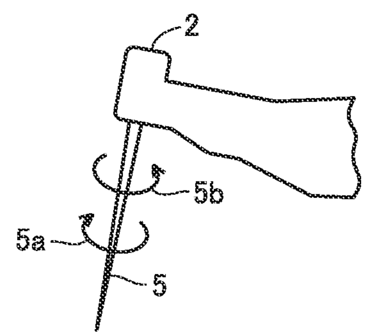
FIG. 4 is a schematic diagram showing a direction of rotation of a cutting tool.

FIG. 4 is a schematic diagram showing a direction of rotation of cutting tool 5. In connection with the direction of rotation of cutting tool 5 shown in FIG. 4, drive in a clockwise direction 5*a* in which cutting tool 5 is rotated to the right when viewed from the side of cutting tool 5 attached to head 2 toward the tip end of cutting tool 5 and drive in a counterclockwise direction 5*b* in which the cutting tool is rotated to the left are shown. Such drive that drive for rotating cutting tool 5 clockwise 5*a* by a predetermined angle of rotation and drive for rotating cutting tool 5 counterclockwise 5*b* by a predetermined angle of rotation are alternately performed is defined as twist drive. In twist drive, alternately performed clockwise rotation and counterclockwise rotation may be equal to or different from each other in amount of drive.

[Two-Tiered Control]

Figure 5:
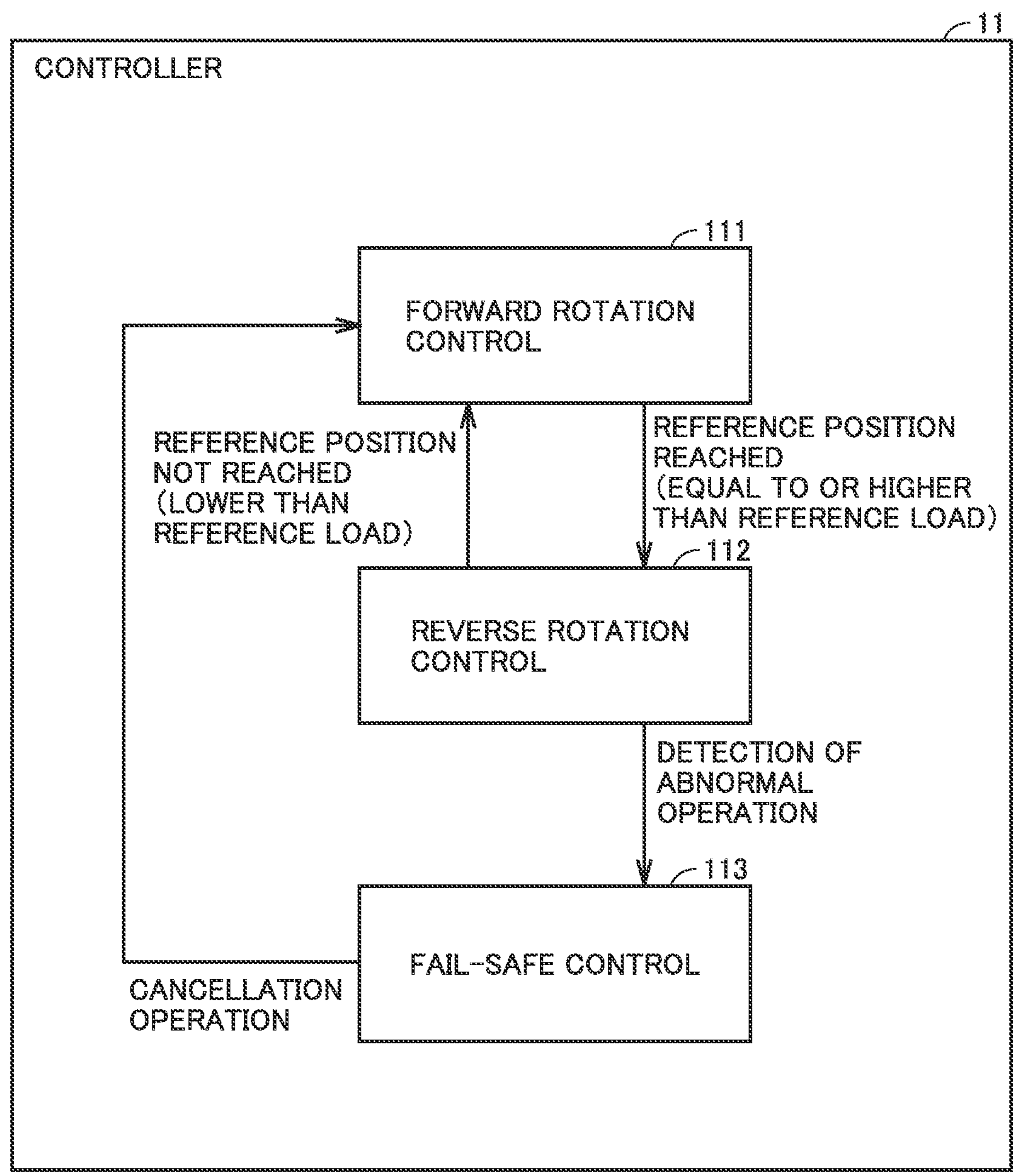
FIG. 5 is a block diagram for illustrating a flow of control by a controller of the root canal treatment instrument according to the present first embodiment.

Two-tiered control in root canal treatment instrument 100 according to the present first embodiment will be described. FIG. 5 is a block diagram for illustrating a flow of control by controller 11 of root canal treatment instrument 100 according to the present first embodiment. Controller 11 includes three types of control of forward rotation control 111, reverse rotation control 112, and fail-safe control 113 as control for driving cutting tool 5. Forward rotation control 111 refers to control for forward rotation drive of cutting tool 5 for cutting and enlarging the root canal. In other words, under forward rotation control 111, for example, when the first cutting tool is attached to head 2, cutting tool 5 is mainly controlled to be driven clockwise, and when the second cutting tool is attached to head 2, cutting tool 5 is mainly controlled to be driven counterclockwise.

When root canal length measurement circuit 12 detects the tip end of cutting tool 5 reaching the reference position (for example, the root apex position) while cutting tool 5 is driven under forward rotation control 111 to cut and enlarge the root canal, controller 11 makes transition of control from forward rotation control 111 to reverse rotation control 112. Reverse rotation control 112 refers to control for reversing drive from forward rotation drive to reverse rotation drive. In other words, under reverse rotation control 112, for example, when the first cutting tool is attached to head 2, cutting tool 5 is controlled mainly to be driven counterclockwise, and when the second cutting tool is attached to head 2, cutting tool 5 is mainly controlled to be driven clockwise. The reference position may be set, for example, to a position within the root canal set in advance by a user, other than the root apex position.

The tip end of cutting tool 5 advances toward the root apex position while the cutting tool cuts and enlarges the root canal as it is forward driven, and the tip end of cutting tool 5 advances in the direction away from the reference position as the cutting tool is reverse driven. Therefore, under reverse rotation control 112, drive is controlled to be in the direction away from the reference position as a result of reverse rotation drive of cutting tool 5. When root canal length measurement circuit 12 detects the tip end of cutting tool 5 not reaching the reference position as a result of reverse rotation drive of cutting tool 5, control can be set from reverse rotation control 112 back to forward rotation control 111.

When cutting tool 5 attached to head 2 is wrong, however, the tip end of cutting tool 5 advances further toward the root apex position in spite of reverse rotation drive of cutting tool 5 under reverse rotation control 112. Then, when root canal length measurement circuit 12 detects movement of the tip end of cutting tool 5 toward the root apex position in reverse rotation drive of cutting tool 5 under reverse rotation control 112, control makes transition from reverse rotation control 112 to fail-safe control 113, with that detection being regarded as detection of an abnormal operation.

Fail-safe control 113 refers to control for stopping drive of cutting tool 5. Root canal treatment instrument 100 can thus prevent cutting and enlargement beyond the root apex position in spite of attachment of wrong cutting tool 5 to head 2. Fail-safe control 113 is not limited only to control for stopping drive of cutting tool 5 so long as the abnormal operation can be prevented in drive under reverse rotation control 112 in spite of attachment of wrong cutting tool 5 to head 2. Fail-safe control 113 may include at least any one, for example, of control for lowering a rotation speed of cutting tool 5, control for twist drive of cutting tool 5, control for reversing the direction of drive of cutting tool 5, control for output of sound, control for output of light, and control for vibrating handpiece 1. Specifically, fail-safe control 113 may prevent the abnormal operation in the event of wrong cutting tool 5, by control for reversing the direction of drive of cutting tool 5 and switching of reverse rotation drive of cutting tool 5 under reverse rotation control 112 to forward rotation drive. Alternatively, fail-safe control 113 may prevent the abnormal operation in the event of wrong cutting tool 5, by control for giving a notification of the abnormal operation by output of sound or light through notification unit 17 when root canal length measurement circuit 12 detects movement of the tip end of cutting tool 5 toward the root apex position.

When drive of cutting tool 5 is stopped under fail-safe control 113, this control is continued until a cancellation operation is performed. In other words, a cancellation operation is required for return from fail-safe control 113 to forward rotation control 111. Examples of the cancellation operation include an operation by root canal length measurement circuit 12 to detect the tip end of cutting tool 5 reaching a prescribed position (for example, a mouth of the root canal) which is a position on a side of a crown relative to the reference position. The cancellation operation is not limited as such, and another operation such as pressing and holding drive start and stop button 15*a* may be applicable.

Figure 6:
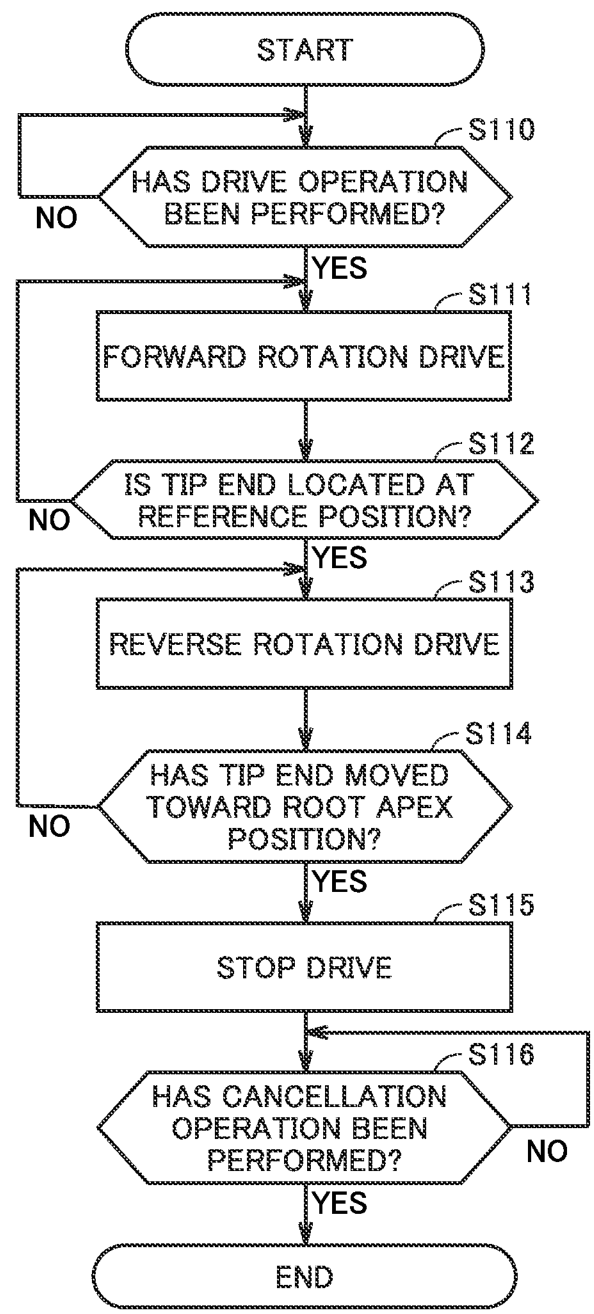
FIG. 6 is a flowchart for illustrating two-tiered control carried out in the root canal treatment instrument according to the present first embodiment.
Figure 7:
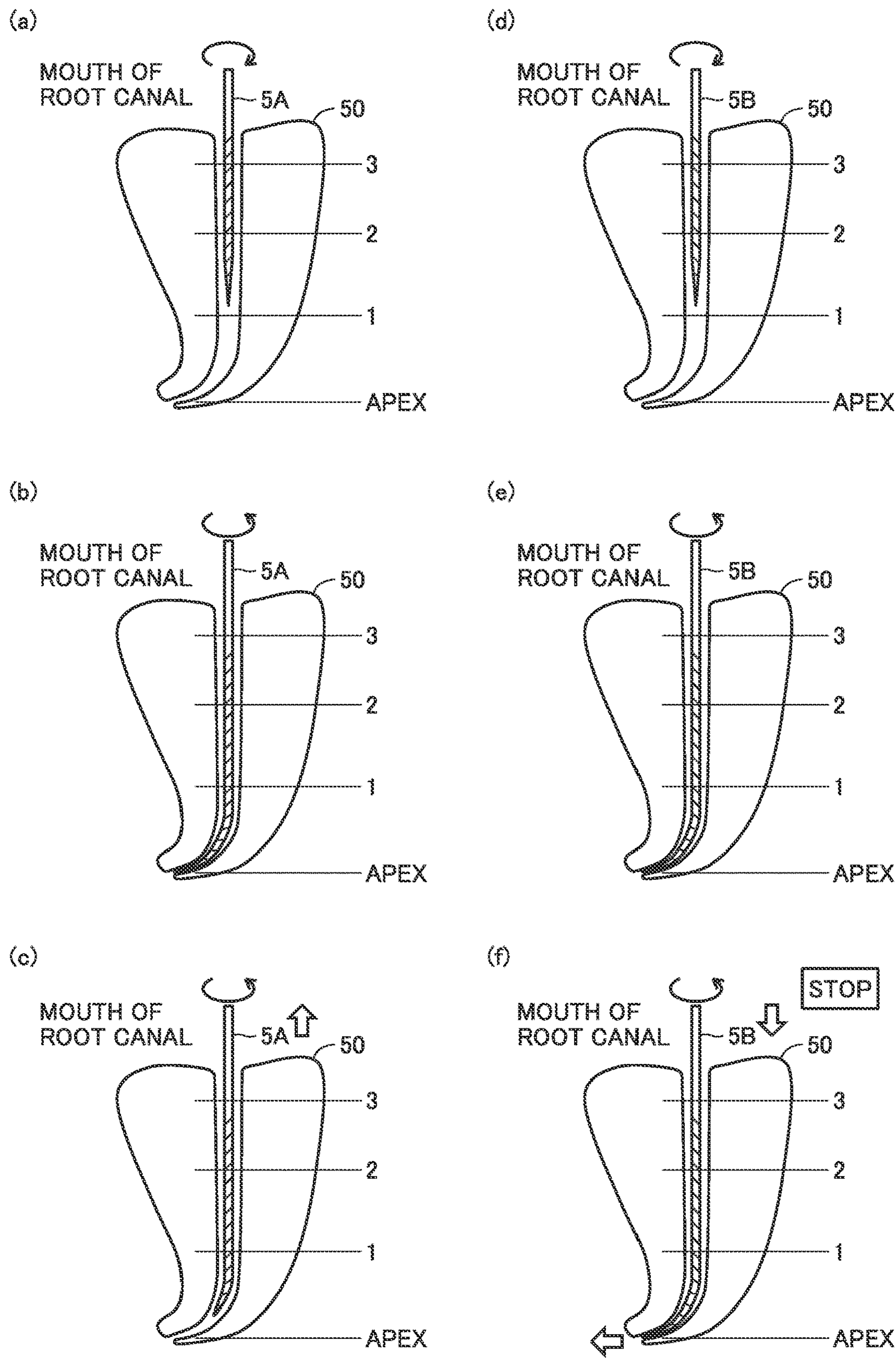
FIG. 7 is a schematic diagram for illustrating two-tiered control carried out in the root canal treatment instrument according to the present first embodiment.

Root canal treatment instrument 100 is subjected to two-tiered control in which, when the tip end of cutting tool 5 reaches the reference position while cutting tool 5 is driven under forward rotation control 111 as shown in FIG. 5, tier-one control to switch to drive under reverse rotation control 112 is carried out, and when an abnormal operation is further detected, tier-two control to switch to drive under fail-safe control 113 is carried out. Two-tiered control will be described with reference to a flowchart and a schematic diagram. FIG. 6 is a flowchart for illustrating two-tiered control carried out in root canal treatment instrument 100 according to the present first embodiment. FIG. 7 is a schematic diagram for illustrating two-tiered control carried out in root canal treatment instrument 100 according to the present first embodiment. The flowchart and the schematic diagram below illustrate an example in which the root canal is cut and enlarged in forward rotation drive of the first cutting tool as cutting tool 5 for the sake of brevity of illustration.

Initially, controller 11 determines whether or not a user has pressed drive start and stop button 15*a* to perform a drive operation (step S110). When the drive operation has not been performed (NO in step S110), the process returns to step S110, and the drive operation by the user is awaited. When the drive operation has been performed (YES in step S110), controller 11 has cutting tool 5 forward driven (step S111). In other words, cutting tool 5 is driven under forward rotation control 111 shown in FIG. 5, and a first cutting tool 5A is attached to head 2 to cut and enlarge the root canal as shown in FIG. 7 (*a*).

When cutting tool 5 is forward driven, root canal length measurement circuit 12 measures a position of the tip end of cutting tool 5 within the root canal. Controller 11 determines whether or not the tip end of cutting tool 5 measured by root canal length measurement circuit 12 is located at the reference position (for example, the root apex position) (step S112). When the tip end of cutting tool 5 is not located at the reference position (NO in step S112), the process returns to step S111, and controller 11 continues determination as to whether or not the tip end of cutting tool 5 is located at the reference position.

When the tip end of cutting tool 5 reaches the reference position (YES in step S112), controller 11 has cutting tool 5 reverse driven (step S113). In other words, cutting tool 4 is driven under reverse rotation control 112 shown in FIG. 5, and the tip end of first cutting tool 5A reaches the root apex position and first cutting tool 5A is reverse driven as shown in FIG. 7 (*b*).

When first cutting tool 5A is reverse driven, the tip end of first cutting tool 5A advances in a direction in which the tip end of first cutting tool 5A moves away from the root apex position (FIG. 7 (*c*)). When a second cutting tool 5B is wrongly attached to head 2, however, the tip end of second cutting tool 5B further advances toward the root apex position (FIG. 7 (*f*)) because reverse rotation drive of first cutting tool 5A is equivalent to forward rotation drive of second cutting tool 5B. Basically, drive under reverse rotation control 112 is drive for preventing the tip end of cutting tool 5 that has reached the reference position from further advancing beyond the reference position. Therefore, when controller 11 has cutting tool 5 driven under reverse rotation control 112 but the tip end of cutting tool 5 further advances toward the root apex position, it determines such an operation as the abnormal operation unintended by the user.

Figure 8:
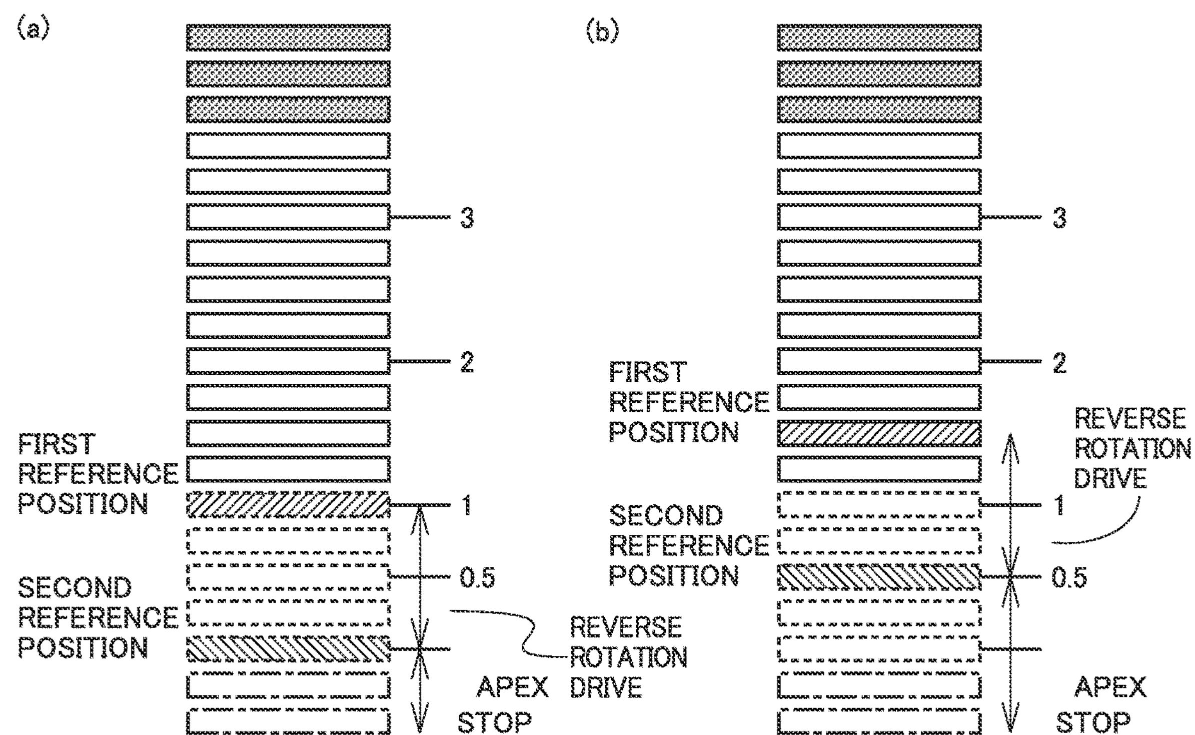
FIG. 8 is a schematic diagram for illustrating a first reference position and a second reference position set in the root canal treatment instrument according to the present first embodiment.

Controller 11 makes determination as to the abnormal operation based on whether or not the position of the tip end of cutting tool 5 measured by root canal length measurement circuit 12 has moved toward the root apex position (step S114). Determination by root canal length measurement circuit 12 as to whether or not the tip end of cutting tool 5 has moved toward the root apex position will be described in detail. For example, root canal length measurement circuit 12 sets the reference position at which cutting tool 5 is reverse driven as the first reference position, and sets the position of the root apex or a position closer to the root apex than the first reference position as the second reference position. FIG. 8 is a schematic diagram for illustrating the first reference position and the second reference position set in the root canal treatment instrument according to the present first embodiment. In FIG. 8 (*a*), when root canal length measurement circuit 12 has a position in the root canal shown with a 20-dot block, the first reference position is set at a block marked with 1 and the second reference position is set at a block marked as the position of the root apex (APEX). In other words, the second reference position is set as an absolute root apex position. The position where the second reference position is set is not limited to the position of the root apex and may be set at a position in the vicinity (for example, a range within two blocks around the APEX mark) of the position of the root apex. In FIG. 8 (*b*), when root canal length measurement circuit 12 has a position in the root canal shown with a 20-dot block, the first reference position is set at a block two-dots above the block marked with 1, and a position toward the root apex, for example, at three-dot interval from the first reference position is set as the second reference position. The second reference position is set as a position relative to the first reference position.

By setting the first reference position and the second reference position, controller 11 can make determination as to the abnormal operation, regarding detection by root canal length measurement circuit 12 of the tip end of cutting tool 5 reaching the second reference position as a result of reverse rotation drive of cutting tool 5, as detection by root canal length measurement circuit 12 of movement of the tip end of cutting tool 5 toward the root apex. In other words, when the position of the tip end of cutting tool 5 measured based on representation by root canal length measurement circuit 12 shown in FIG. 8 (*a*) reaches the first reference position from the top in the figure, controller 11 has cutting tool 5 reverse driven, and when the measured position of the tip end of cutting tool 5 reaches the second reference position in spite of reverse rotation drive, controller 11 stops drive of cutting tool 5. Determination by root canal length measurement circuit 12 as to whether or not the tip end of cutting tool 5 has moved toward the root apex position is not limited to determination in a case where the first reference position and the second reference position are set. For example, whether or not movement from the position of the tip end of cutting tool 5 measured by root canal length measurement circuit 12 toward the root apex position has been made may be determined without setting the second reference position.

Referring back to FIG. 6, when the tip end of cutting tool 5 has not moved toward the root apex position (NO in step S114), the process returns to step S113 and controller 11 continues reverse rotation drive under reverse rotation control 112. When the tip end of cutting tool 5 has moved toward the root apex position (YES in step S114), controller 11 makes determination as the abnormal operation and stops drive of cutting tool 5 under fail-safe control 113 (step S115). When controller 11 makes determination as the abnormal operation, controller 11 may carry out control for reversing the direction of drive of cutting tool 5 (forward rotation drive in the flowchart) rather than stopping drive of cutting tool 5.

When controller 11 makes determination as the abnormal operation and drive of cutting tool 5 is stopped, controller 11 determines whether or not a user has performed a cancellation operation (step S116). When the cancellation operation has not been performed (NO in step S116), the process returns to step S116 and the cancellation operation by the user is awaited. When the cancellation operation has been performed (YES in step S116), controller 11 quits drive of cutting tool 5 under fail-safe control 113. In other words, controller 11 sets drive of cutting tool 5 back to forward rotation control 111. When the first reference position and the second reference position are set as described above, for example, an operation to move the tip end of cutting tool 5 until the position of the tip end of cutting tool 5 measured by root canal length measurement circuit 12 reaches the first reference position may be applicable as the cancellation operation. The position to which the tip end of cutting tool 5 is moved in the cancellation operation is not limited to the first reference position, and a prescribed position on the side of the crown relative to the root apex position may be applicable. When the cancellation operation to set the position of the tip end of cutting tool 5, drive of which has been stopped under fail-safe control 113, from the second reference position back to the first reference position is performed as seen in representation by root canal length measurement circuit 12 shown in FIG. 8 (*a*), controller 11 sets drive of cutting tool 5 back to drive under forward rotation control 111.

As set forth above, root canal treatment instrument 100 according to the present first embodiment includes a drive unit constituted of micromotor 7, motor driver 13, and the like, controller 11, and root canal length measurement circuit 12. The drive unit drives cutting tool 5 held at head 2 of handpiece 1. Controller 11 controls the drive unit that drives cutting tool 5. Root canal length measurement circuit 12 detects a position of the tip end of cutting tool 5 within the root canal by electric root canal length measurement. Controller 11 has cutting tool 5 held at head 2 forward driven in the direction of cutting of an object to be cut, has cutting tool 5 reverse driven in a direction reverse to forward rotation drive when cutting tool 5 is forward driven and root canal length measurement circuit 12 detects the tip end of cutting tool 5 reaching the reference position, and carries out fail-safe control when cutting tool 5 is reverse driven and root canal length measurement circuit 12 detects movement of the tip end of cutting tool 5 toward the root apex position.

Thus, in root canal treatment instrument 100 according to the present first embodiment, when cutting tool 5 is driven under reverse rotation control 112 but an unintended operation is performed, drive of cutting tool 5 is controlled under fail-safe control 113. Therefore, even when wrong cutting tool 5 is attached to head 2, the cutting tool can safely be driven.

Fail-safe control includes at least any one of control for stopping drive of cutting tool 5, control for lowering a rotation speed of cutting tool 5, control for twist drive of cutting tool 5, control for reversing a direction of drive of cutting tool 5, control for output of sound, control for output of light, and control for vibrating handpiece 1.

Root canal treatment instrument 100 according to the present first embodiment can thus provide appropriate fail-safe control in conformity with drive of cutting tool 5.

The reference position is a position within the root canal set in advance by a user or the position of the root apex. The user can thus set any position at which cutting tool 5 is reverse driven under reverse rotation control 112.

When controller 11 carries out fail-safe control 113, it continues fail-safe control until a cancellation operation is performed. Drive of cutting tool 5 under fail-safe control 113 is thus maintained until safe drive is ensured.

The cancellation operation is an operation by root canal length measurement circuit 12 to detect the tip end of the cutting tool reaching a prescribed position located on the side of the crown relative to the reference position. Thus, even when drive of cutting tool 5 under fail-safe control 113 is canceled, safe drive can be ensured.

Root canal treatment instrument 100 further includes notification unit 17 that gives a notification to the user. When cutting tool 5 is reverse driven and root canal length measurement circuit 12 detects movement of the tip end of cutting tool 5 toward the root apex position, notification unit 17 gives a notification of abnormality. The user can thus recognize that the abnormal operation is being performed in drive of cutting tool 5 under reverse rotation control 112.

A method of driving root canal treatment instrument 100 includes forward driving cutting tool 5 held at head 2 in a direction of cutting of an object to be cut, reverse driving cutting tool 5 in a direction reverse to forward rotation drive when cutting tool 5 is forward driven and root canal length measurement circuit 12 detects the tip end of cutting tool 5 reaching the reference position, and carrying out fail-safe control when cutting tool 5 is reverse driven and root canal length measurement circuit 12 detects movement of the tip end of cutting tool 5 toward the root apex position.

In the method of driving root canal treatment instrument 100 according to the present first embodiment, when cutting tool 5 is driven in reverse rotation drive but an unintended operation is performed, cutting tool 5 is driven under fail-safe control. Therefore, even when wrong cutting tool 5 is attached to head 2, the cutting tool can safely be driven.

Second Embodiment

Figure 9:
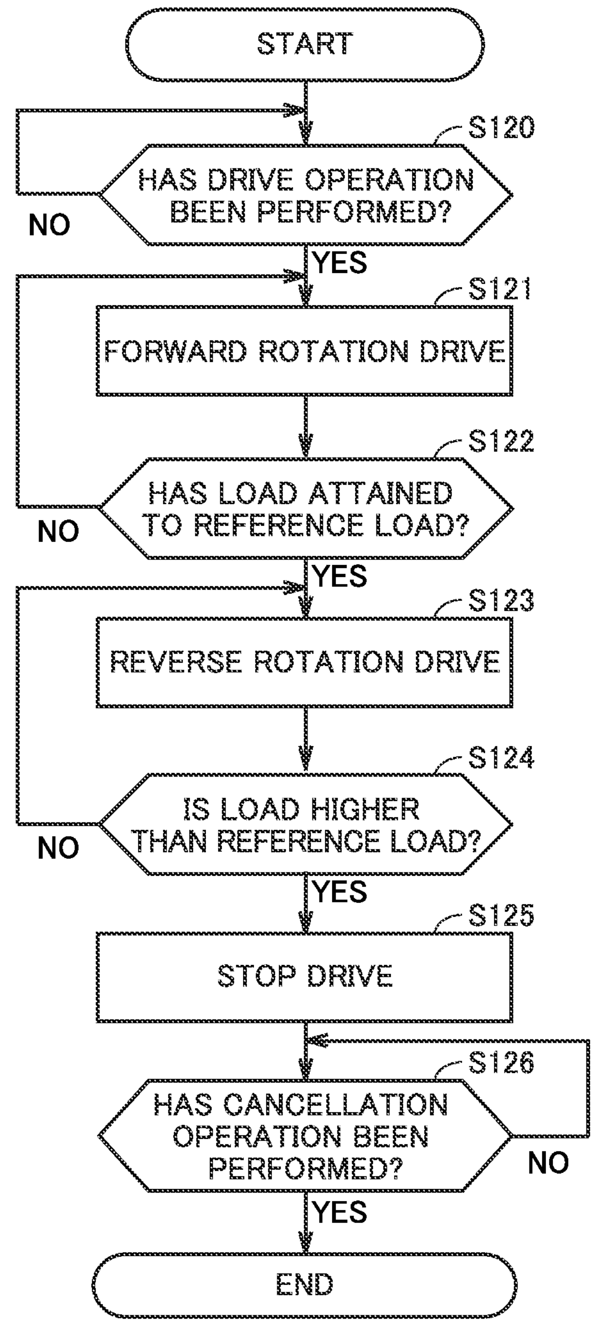
FIG. 9 is a flowchart for illustrating two-tiered control carried out in the root canal treatment instrument according to the present second embodiment.

For root canal treatment instrument 100 according to the present first embodiment, two-tiered control in which switching to drive under reverse rotation control 112 and drive under fail-safe control 113 is made based on positional relation between the position of the tip end of cutting tool 5 and the reference position is described. Without being limited thereto, in root canal treatment instrument 100, two-tiered control in which switching to drive under reverse rotation control 112 and drive under fail-safe control 113 is made based on a condition other than positional relation between the position of the tip end of cutting tool 5 and the reference position may be carried out. Two-tiered control carried out in the root canal treatment instrument according to the present second embodiment will be described with reference to a flowchart. FIG. 9 is a flowchart for illustrating two-tiered control carried out in root canal treatment instrument 100 according to the present second embodiment. Since root canal treatment instrument 100 according to the present second embodiment is also the same in configuration as root canal treatment instrument 100 according to the first embodiment shown in FIGS. 1 to 3, the same reference characters are allotted and detailed description will not be repeated.

Initially, controller 11 determines whether or not the user has pressed drive start and stop button **15*a* to perform a drive operation (step S120). When the drive operation has not been performed (NO in step S120), the process returns to step S120, and the drive operation by the user is awaited. When the drive operation has been performed (YES in step S120), controller 11 has cutting tool 5 forward driven in a normal operation (step S121). In other words, cutting tool 5 is driven under forward rotation control 111 shown in FIG. 5**.

A load detector determines whether or not a load applied to cutting tool 5 has attained to a reference load (step S122). Specifically, when the load applied to cutting tool 5 has attained to the reference load, controller 11 switches drive from drive under forward rotation control 111 to drive under reverse rotation control 112 in order to prevent break of cutting tool 5. When the load applied to cutting tool 5 is lower than the reference load (NO in step S122), the process returns to step S121, and controller 11 continues determination as to whether or not the load applied to cutting tool 5 has attained to the reference load.

When the load applied to cutting tool 5 has attained to the reference load (YES in step S122), controller 11 has cutting tool 5 reverse driven in a reverse operation (step S123). In other words, cutting tool 5 is driven under reverse rotation control 112 shown in FIG. 5.

When first cutting tool 5A is reverse driven, first cutting tool 5A is rotated in the non-cutting direction. Therefore, the cutting edge of cutting tool 5 that has dug into the wall of the root canal is removed and the load applied to first cutting tool 5A is lowered. When second cutting tool 5B is wrongly attached to head 2, however, second cutting tool 5B is rotated in the cutting direction and the cutting edge of cutting tool 5 that has dug into the wall of the root canal digs deeper and the load applied to second cutting tool 5B is higher, because reverse rotation drive of first cutting tool 5A is equivalent to forward rotation drive of second cutting tool 5B. Basically, drive under reverse rotation control 112 aims at driving cutting tool 5 such that the load applied thereto is lower than the reference load for preventing break of cutting tool 5. Therefore, when controller 11 has cutting tool 5 driven under reverse rotation control 112 but the load applied to cutting tool 5 is higher than the reference load, it determines such an operation as the abnormal operation unintended by the user.

Controller 11 makes determination as to the abnormal operation based on detection by the load detector as to whether or not the load applied to cutting tool 5 is higher than the reference load (step S124). When the load applied to cutting tool 5 is lower than the reference load (NO in step S124), the process returns to step S123 and controller 11 has reverse rotation drive continued under reverse rotation control 112. When the load applied to cutting tool 5 is higher than the reference load (YES in step S124), controller 11 makes determination as the abnormal operation and has drive of cutting tool 5 stopped under fail-safe control 113 (step S125). When controller 11 makes determination as the abnormal operation, it may carry out control for reversing the direction of drive of cutting tool 5 (forward rotation drive in the flowchart) rather than stopping drive of cutting tool 5.

When controller 11 makes determination as the abnormal operation and has drive of cutting tool 5 stopped, it determines whether or not the user has performed the cancellation operation (step S126). When the cancellation operation has not been performed (NO in step S126), the process returns to step S126 and the cancellation operation by the user is awaited. When the cancellation operation has been performed (YES in step S126), controller 11 quits drive of cutting tool 5 under fail-safe control 113. In other words, controller 11 sets drive of cutting tool 5 back to drive under forward rotation control 111.

As set forth above, root canal treatment instrument 100 according to the present second embodiment includes a drive unit constituted of micromotor 7, motor driver 13, and the like, controller 11, and the load detector. The drive unit drives cutting tool 5 held at head 2 of handpiece 1. Controller 11 controls the drive unit that drives cutting tool 5. The load detector detects a load applied to cutting tool 5. Controller 11 has cutting tool 5 held at head 2 forward driven in the direction of cutting of an object to be cut, has cutting tool 5 reverse driven in a direction reverse to forward rotation drive when cutting tool 5 is forward driven and the load applied to cutting tool 5 and detected by the load detector is equal to or higher than the reference load, and carries out fail-safe control when cutting tool 5 is revere driven and the load applied to cutting tool 5 and detected by the load detector is equal to or higher than the reference load.

Thus, in root canal treatment instrument 100 according to the present second embodiment, when cutting tool 5 is driven under reverse rotation control 112 but an unintended operation is performed, drive of cutting tool 5 is controlled under fail-safe control 113. Therefore, even when wrong cutting tool 5 is attached to head 2, the cutting tool can safely be driven.

The feature of two-tiered control in which switching to reverse rotation control 112 and fail-safe control 113 is made based on relation of magnitude between the load applied to cutting tool 5 and the reference load described in the present second embodiment may be combined with the feature of two-tiered control based on relation with the reference position in root canal treatment instrument 100 according to the first embodiment. The feature of root canal treatment instrument 100 alone according to the present second embodiment may be applied to a root canal treatment instrument only for enlargement of the root canal that is capable of detecting a load applied to cutting tool 5 without including a root canal length measurement system.

Figure 10:
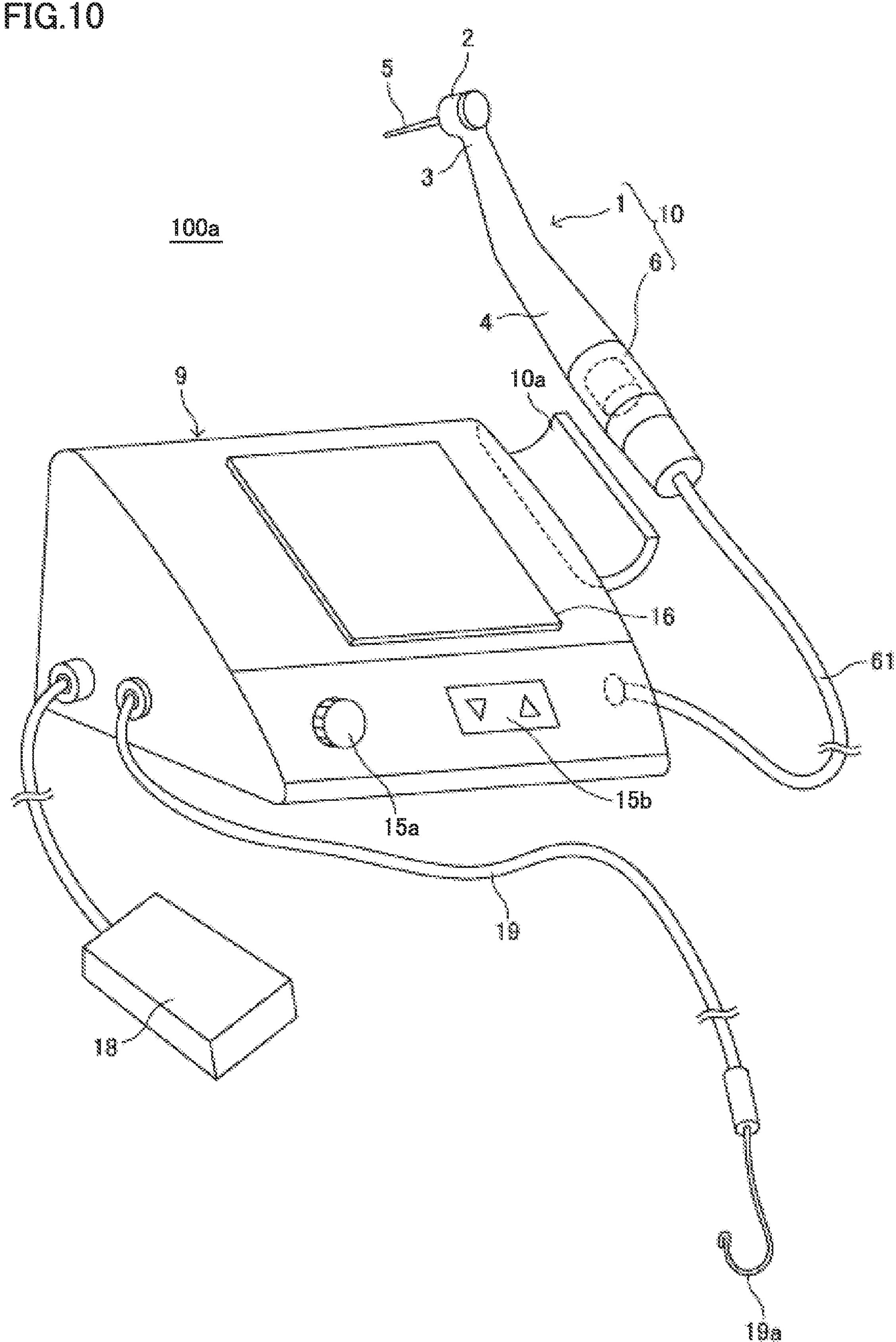
FIG. 10 is a schematic diagram showing a construction of a root canal treatment instrument connected through a cord to a control box provided outside a handpiece.

Modification (1) Though the cordless type root canal treatment instrument containing motor unit 6 or control box 9 is described as root canal treatment instrument 100 according to the first to second embodiments, without being limited as such, handpiece 1 may be coupled to externally provided control box 9 through a hose 61. FIG. 10 is a schematic diagram showing a construction of a root canal treatment instrument 100*a* connected through a cord to control box 9 provided outside handpiece 1. Features the same as those shown in FIGS. 1 to 3 among features of root canal treatment instrument 100 have the same reference numerals allotted and detailed description will not be repeated.

Root canal treatment instrument 100*a* shown in FIG. 10 includes handpiece 1 for dental root canal treatment, motor unit 6, and control box 9. In handpiece 1 for dental root canal treatment, motor unit 6 for rotationally driving cutting tool 5 (a file or a reamer) held at head 2 is removably connected to a base of grip 4. A dental instrument 10 is constructed in such a manner that motor unit 6 is coupled to handpiece 1.

Motor unit 6 contains micromotor 7 and is connected to control box 9 through power supply lead 71 supplying power to micromotor 7 and hose 61 containing signal lead 8 transmitting a signal to root canal length measurement circuit 12.

As shown in FIG. 10, a holder 10*a* for holding instrument 10 while the instrument is not used is attached to control box 9 in a side portion of a main body. In control box 9, a foot controller 18 is coupled to controller 11 and lead 19 is coupled to root canal length measurement circuit 12. Though lead 19 is pulled out of control box 9, it may be pulled out as being branched from a point intermediate in hose 61.

Setting unit 14 includes selection button 15*b* for changing setting on the surface of control box 9. By operating selection button 15*b*, the reference for controlling a direction of rotation, the number of rotations, and an angle of rotation of cutting tool 5 is set.

Operation portion 15 includes drive start and stop button 15*a* on the surface of control box 9. By operating drive start and stop button 15*a*, drive of cutting tool 5 can be started or stopped.

Foot controller 18 is an operation acceptance portion with which drive and control of cutting tool 5 by micromotor 7 is indicated through a stepping operation. Drive and control of cutting tool 5 by micromotor 7 is not limited to drive and control with foot controller 18. An operation switch (not shown) may be provided in grip 4 of handpiece 1 and cutting tool 5 may be driven and controlled by using both of the operation switch and foot controller 18. For example, when root canal length measurement circuit 12 detects insertion of cutting tool 5 into a root canal while an operation to step on foot controller 18 is performed, rotation of cutting tool 5 may be started.

Though control box 9 of root canal treatment instrument 100*a* is used as being placed on a tray table or a side table set at a side portion of a dental treatment couch, the present invention is not limited as such and control box 9 may be incorporated in the tray table or the side table.

(2) Though micromotor 7 is employed as a source of motive power for driving cutting tool 5 in root canal treatment instrument 100 according to the first to second embodiments, without being limited as such, another drive source such as an air motor may be provided.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 handpiece; 2 head; 3 neck; 4 grip; 5 cutting tool; 6 motor unit; 7 micromotor; 8 signal lead; 9 control box; 10 instrument; 10*a* holder; 11 controller; 12 root canal length measurement circuit; 13 motor driver; 13*a* transistor switch; 13*b* transistor driver circuit; 13*c* rotation direction switch; 13*d* load detection resistor; 14 setting unit; 14*a*, 14*b*, 14*c* variable resistor; 15 operation portion; 15*a* drive start and stop button; 15*b* selection button; 16 display; 17 notification unit; 18 foot controller; 19 lead; 19*a* mouth cavity electrode; 100 root canal treatment instrument; 110 comparison circuit

The invention claimed is:

1. A dental treatment apparatus comprising:

a drive unit comprising a micromotor and a motor driver that drives a cutting tool held at a head of a handpiece;

a microcomputer that controls the drive unit that drives the cutting tool; and a position detector that detects a position of a tip end of the cutting tool within a root canal by electric root canal length measurement, wherein the microcomputer controls the cutting tool to be held at the head forward driven in a direction of cutting of an object to be cut, wherein the microcomputer controls the cutting tool to be reverse driven in a direction reverse to forward rotation drive when the cutting tool is forward driven and the position detector detects the tip end of the cutting tool reaching a reference position;

wherein the microcomputer carries out a fail-safe control when the position detector detects movement of the tip of the cutting tool toward a root apex position while the cutting tool is reverse driven;

wherein the cutting tool being controlled to be forward driven comprises the cutting tool being controlled to mainly be driven clockwise, and wherein the cutting tool being controlled to be reverse driven comprises the cutting tool being controlled to mainly be driven counterclockwise.

2. The dental treatment apparatus according to claim 1, wherein the fail-safe control includes at least any one of: control for stopping drive of the cutting tool, control for lowering a rotation speed of the cutting tool, control for twist drive of the cutting tool, control for reversing a direction of drive of the cutting tool, control for output of sound, control for output of light, and control for vibrating the handpiece.

3. The dental treatment apparatus according to claim 2, wherein the reference position is a position within the root canal set in advance by a user or a position of a root apex.

4. The dental treatment apparatus according to claim 3, wherein when the microcomputer carries out the fail-safe control, the microcomputer continues the fail-safe control until a cancellation operation is performed.

5. The dental treatment apparatus according to claim 2, wherein the position detector sets the reference position at which the cutting tool is reverse driven as a first reference position, and sets a position of a root apex or a position closer to the root apex than the first reference position as a second reference position, wherein the microcomputer carries out the fail-safe control when the cutting tool is reverse driven and the position detector detects the tip end of the cutting tool reaching the second reference position as detected by the position detector of movement of the tip end of the cutting tool toward the root apex position.

6. The dental treatment apparatus according to claim 5, wherein when the microcomputer carries out the fail-safe control, the microcomputer continues the fail-safe control until a cancellation operation is performed.

7. The dental treatment apparatus according to claim 2, wherein when the microcomputer carries out the fail-safe control, the microcomputer continues the fail-safe control until a cancellation operation is performed.

8. The dental treatment apparatus according to claim 7, wherein the cancellation operation is an operation to detect the tip end of the cutting tool reaching a prescribed position located on a side of a crown relative to the root apex position.

9. The dental treatment apparatus according to claim 1, wherein the reference position is a position within the root canal set in advance by a user or a position of a root apex.

10. The dental treatment apparatus according to claim 9, wherein when the microcomputer carries out the fail-safe control, the microcomputer continues the fail-safe control until a cancellation operation is performed.

11. The dental treatment apparatus according to claim 10, wherein the cancellation operation is an operation to detect the tip end of the cutting tool reaching a prescribed position located on a side of a crown relative to the root apex position.

12. The dental treatment apparatus according to claim 1, wherein the position detector sets the reference position at which the cutting tool is reverse driven as a first reference position, and sets a position of a root apex or a position closer to the root apex than the first reference position as a second reference position, and wherein the microcomputer carries out the fail-safe control when the cutting tool is reverse driven and the position detector detects the tip end of the cutting tool reaching the second reference position as detected by the position detector of movement of the tip end of the cutting tool toward the root apex position.

13. The dental treatment apparatus according to claim 12, wherein when the microcomputer carries out the fail-safe control, the microcomputer continues the fail-safe control until a cancellation operation is performed.

14. The dental treatment apparatus according to claim 13, wherein the cancellation operation is an operation to detect the tip end of the cutting tool reaching a prescribed position located on a side of a crown relative to the root apex position.

15. The dental treatment apparatus according to claim 1, wherein when the microcomputer carries out the fail-safe control, the microcomputer continues the fail-safe control until a cancellation operation is performed.

16. The dental treatment apparatus according to claim 15, wherein the cancellation operation is an operation to detect the tip end of the cutting tool reaching a prescribed position located on a side of a crown relative to the root apex position.

17. The dental treatment apparatus according to claim 1, further comprising a notification unit that gives a notification to a user, wherein when the cutting tool is reverse driven and the position detector detects movement of the tip end of the cutting tool toward the root apex position, the notification unit gives a notification of abnormality.

18. The dental treatment apparatus according to claim 1, further comprising a load detector that detects a load applied to the cutting tool, wherein when the cutting tool is forward driven and a load applied to the cutting tool and detected by the load detector is equal to or higher than a reference load, the cutting tool is reverse driven in the direction reverse to forward rotation drive, and wherein when the cutting tool is reverse driven and the load applied to the cutting tool and detected by the load detector is equal to or higher than the reference load, the fail-safe control is carried out.

19. A dental treatment apparatus comprising:

a drive unit comprising a micromotor and a motor driver that drives a cutting tool held at a head of a handpiece;

a microcomputer that controls the drive unit that drives the cutting tool;

a position detector that detects a position of a tip end of the cutting tool within a root canal by electric root canal length measurement; and a load detector that detects a load applied to the cutting tool, wherein the microcomputer controls the cutting tool to be held at the head forward driven in a direction of cutting of an object to be cut, wherein the microcomputer controls the cutting tool to be reverse driven in a direction reverse to forward rotation drive when the cutting tool is forward driven and the load applied to the cutting tool and detected by the load detector is equal to or higher than a reference load, wherein the microcomputer controls the cutting tool to be reverse driven in a direction reverse to forward rotation drive when the cutting tool is forward driven and the position detector detects the tip end of the cutting tool reaching a reference position, wherein the microcomputer carries out a fail-safe control when the position detector detects movement of the tip of the cutting tool toward a root apex position while the cutting tool is reverse driven;

wherein the microcomputer carries out fail-safe control when the cutting tool is reverse driven and the load applied to the cutting tool and detected by the load detector is equal to or higher than the reference load;

wherein the cutting tool being controlled to be forward driven comprises the cutting tool being controlled to mainly be driven clockwise, and wherein the cutting tool being controlled to be reverse driven comprises the cutting tool being controlled to mainly be driven counterclockwise.

20. A method of driving a dental treatment apparatus, the dental treatment apparatus including a drive unit comprising a micromotor and a motor driver that drives a cutting tool held at a head of a handpiece, a microcomputer that controls the drive unit that drives the cutting tool, and a position detector that detects a position of a tip end of the cutting tool within a root canal by electric root canal length measurement, the method comprising:

forward driving, under control by the microcomputer, the cutting tool held at the head in a direction of cutting of an object to be cut;

reverse driving, under control by the microcomputer, the cutting tool in a direction reverse to forward rotation drive when the cutting tool is forward driven and the position detector detects the tip end of the cutting tool reaching a reference position;

carrying out, by the microcomputer, a fail-safe control when the position detector detects movement of the tip of the cutting tool toward a root apex position while the cutting tool is reverse driven;

wherein forward driving the cutting tool comprises controlling the cutting tool to mainly be driven clockwise, and wherein reverse driving the cutting tool comprises controlling the cutting tool to mainly be driven counterclockwise.

* * * * *